F. HUMPHRIS.
ADJUSTABLE SPANNER, PIPE WRENCH, OR PIPE CUTTER.
APPLICATION FILED JULY 17, 1919.
1,325,402.
Patented Dec. 16, 1919.
3 SHEETS—SHEET 1.
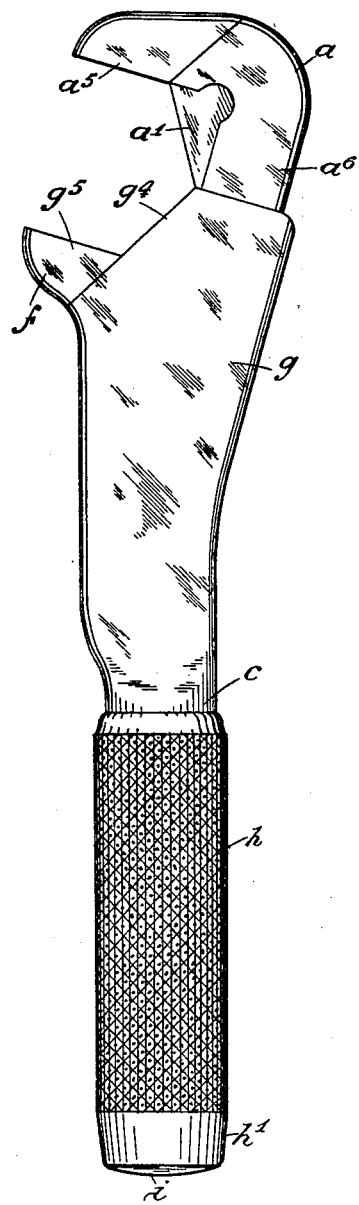
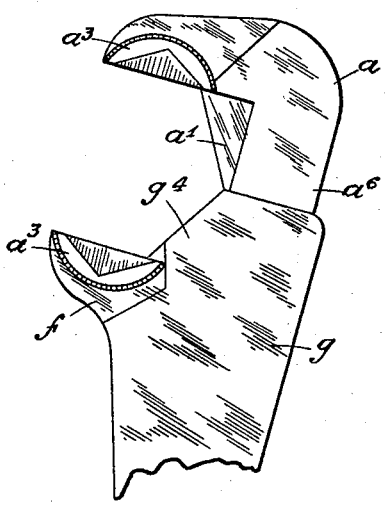
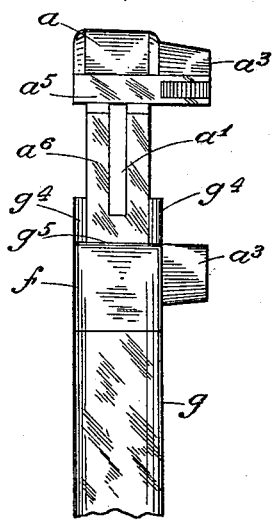

F. HUMPHRIS.
ADJUSTABLE SPANNER, PIPE WRENCH, OR PIPE CUTTER.
APPLICATION FILED JULY 17, 1919.
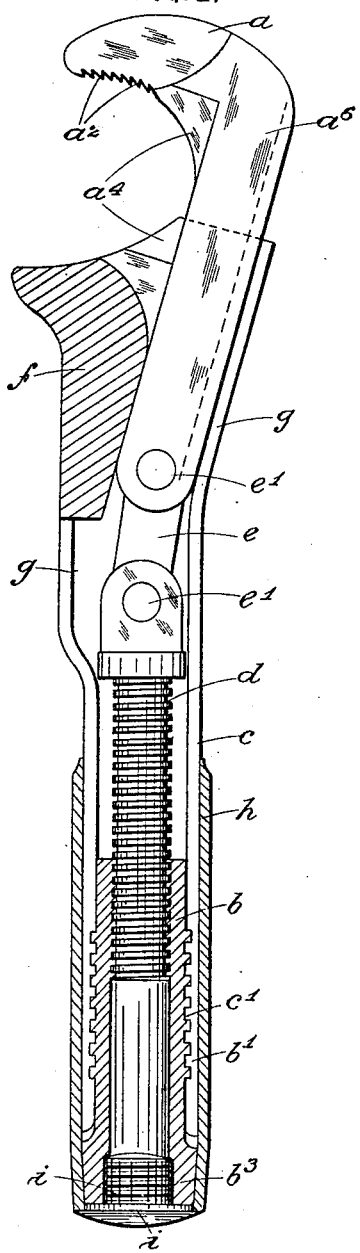
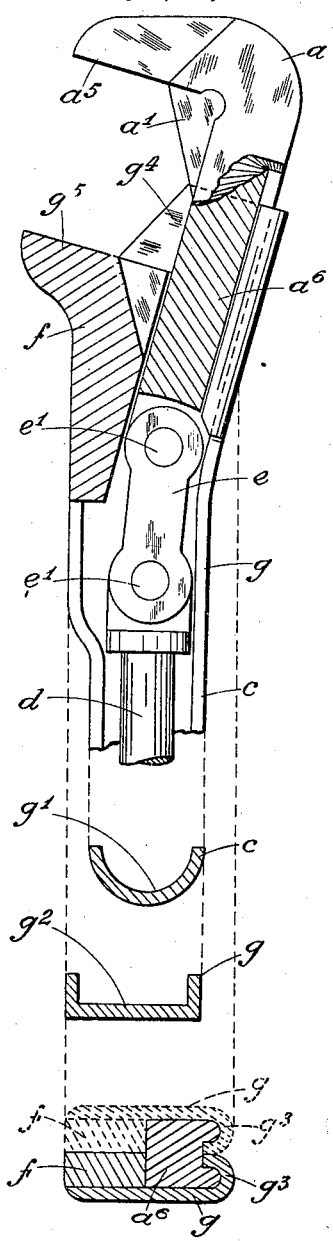

F. HUMPHRIS.
ADJUSTABLE SPANNER, PIPE WRENCH, OR PIPE CUTTER.
APPLICATION FILED JULY 17, 1919.

1,325,402.

Patented Dec. 16, 1919.
3 SHEETS—SHEET 3.

WITNESSES

INVENTOR
Frank Humphris
BY
ATTORNEY

UNITED STATES PATENT OFFICE.

FRANK HUMPHRIS, OF BOSCOMBE, ENGLAND.

ADJUSTABLE SPANNER, PIPE-WRENCH, OR PIPE-CUTTER.

1,325,402.   Specification of Letters Patent.   Patented Dec. 16, 1919.

Application filed July 17, 1919. Serial No. 311,675.

*To all whom it may concern:*

Be it known that I, FRANK HUMPHRIS, a subject of the King of Great Britain, residing at Boscombe, England, have invented a new and useful Improved Adjustable Spanner, Pipe-Wrench, or Pipe-Cutter, of which the following is a specification.

This invention relates to an improved adjustable spanner, pipe-wrench or cutter, made of steel or any other suitable material or metal, in which a movable or sliding jaw is constrained to open and close by means of an internally screw-threaded plug provided with annular ridges around its exterior, which operate in a fixed handle or stem of the device, while the threaded part operates with a bolt and link motion to make the said jaw open and close at an angle or inclination relative to the axis of the handle of the tool. Any angle or inclination of the jaws is selected, which is the most practical one for the particular trade or work upon which the tool is to be used, but angles varying from 10 to 20 degrees inclination from the axis of the handle of the tool are preferably employed. It is obvious that tools embodying the chief parts employed in the construction of the adjustable spanner will be made up as adjustable pipe-grips, pipe-cutters or any similar devices, but for the purpose of giving a more clear understanding, the invention will now be described and illustrated as it will be applied to an adjustable spanner, pipe-wrench and pipe-cutter. It is to be understood, however, that the illustrations are given merely by way of example.

In these drawings:

Figure 1 is a front elevation showing one shape of an adjustable spanner of the kind provided with a slidably mounted jaw which by turning the handle at that end of the tool remote from the jaws mechanically opens and closes at an angle to the axis of the handle or stem of the tool.

Fig. 2 is a part front elevation of an adjustable spanner of the kind shown in Fig. 1 provided with additional parts or protrusions from the sides of the jaws thereof (adjustable box-spanner-wise) for gripping nut or bolt heads or plugs in recesses.

Fig. 3 is a side or edge elevation of Fig. 2.

Fig. 4 is an elevational view partly in section with some of the parts removed, giving the relative position of each part of an adjustable pipe-wrench when the tool is opened. This tool is constructed, excepting for variations for form given to the jaws, in the same manner and with similar parts to those employed in the adjustable spanner shown in Figs. 1, 2, 3 and 5 and the adjustable pipe-cutter shown in Figs. 6 and 7.

Fig. 5 is a part elevational view of Fig. 1 partly in section, with some of the parts removed, giving the relative position of the adjustable jaw, its slidably mounted extension and also the link and some of the motion parts for controlling said jaw, together with sectional views taken through the half body and also some of the parts contained therein as shown by the dotted lines.

Figure 6:
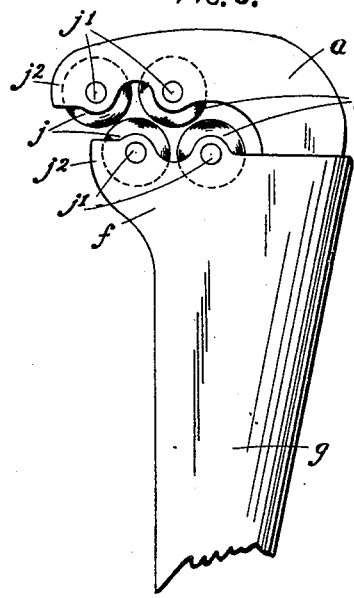

Fig. 6 is a part front elevation showing a modification in the construction of the actual jaws only, of an adjustable tool as shown in Fig. 1 for enabling said tool to be employed as a pipe-cutter. In this figure the jaws are shown closed.

Figure 7:
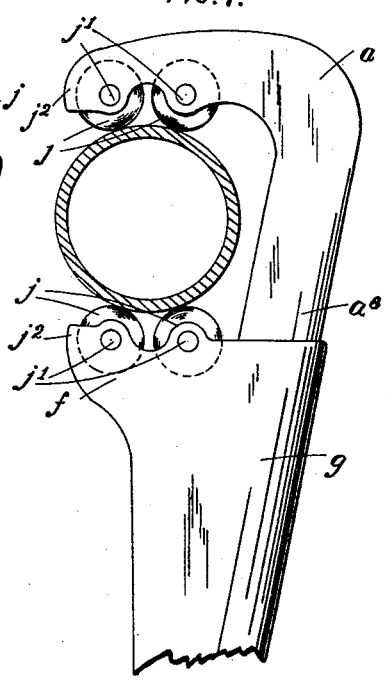

Fig. 7 is a view of the same tool as shown in Fig. 6 with the jaws open and in engagement with a section of pipe.

Figure 8:
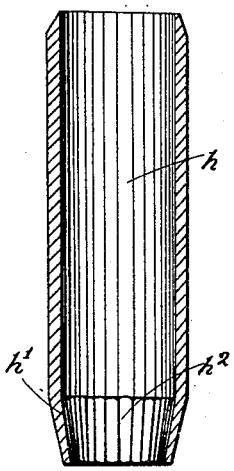
Figure 9:
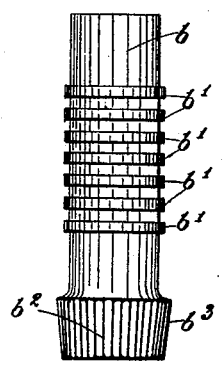

Fig. 8 is a longitudinal sectional view of the hand-gripping cover-piece employed on either form of tool showing the female coning provided with internal serrations at one end thereof for engaging with external serrations provided on the screw-threaded plug or controlling nut shown in Fig. 9.

Fig. 9 is a front elevational view of the controlling nut provided with a multiplicity of annular ridges and also with a serrated conical male part for engaging in the coned serrated part of the cover-piece shown in Fig. 8.

Like letters of reference refer to like parts througout the drawings.

In its construction the invention has two jaw-pieces, one $f$ fixed or secured by means of welding, rivets, or the like in or to the body $g$ of the device, while the other $a$ has a slidable shank $a^6$ engaged by a bent holding flange or guide of the same end of the body $g$ of the tool. To the slidably mounted jaw-piece $a$, at that end of its slide $a^6$ remote from the jaw, by means of a cross-pin $e'$, screw or the like, is provided a link $e$, or links, pivotally mounted to the jaw-piece-slide $a^6$ at one end, and to an eyeleted, collared, and screw-threaded rod $d$ at the other end; said link motion, link or links $e$ are provided and serve to couple the inclined sliding jaw-piece $a$ to the eyeleted screw-threaded rod $d$ upon the screw-threaded part of which rod $d$ the internal threads of a screw-threaded plug or nut $b$ engage and serve in conjunction with annular ridges $b'$ on the exterior thereof, (which further engage in grooves $c'$) in the handle $c$ or body $g$ of the device to impart longitudinal motion to the eyeleted screw-threaded rod $d$, the link or links $e$ and the slidably mounted jaw-piece $a$ at a rate and with a mechanical force proportionate to the pitch of the threads.

The before-mentioned screw-threaded plug $b$ in addition to engaging on its inside the threads of the eyeleted rod or bolt $d$ engages by means of its external annular ridges $b'$ internally formed annular grooves $c'$ preferably in the handle end $c$ of the body part $g$ of the device; it is further, at one end thereof, provided with an enlarged and coned part $b^3$ which is knurled, serrated, or similarly formed as at $b^2$, so as to serve and engage (positive-clutch-wise) in one end of a tubular or hollow hand-gripping cover-piece $h$, provided with a conical extremity $h'$ also knurled or serrated as at $h^2$ to receive it.

Said cover-piece $h$ encompasses a portion of the stem or handle end $c$ of the body $g$ of the device, and serves when the body $g$ is made in two or more parts to hold the parts so engaged concentric to the axis of the screw-threaded plug $b$.

Said cover-piece $h$ is formed on its exterior with suitable hand-gripping faces, obtained by nurling, or serrating it in axial alinement or the like. The cover-piece $h$ and plug $b$ are also both secured against longitudinal movement relatively to each other by means of the male coned part $b^3$ of the screw-threaded nut or plug $b$ being drawn into the female coned part $h^2$ of the cover-piece $h$ by means of a large-headed screw $i$ or the like substitute, which is threaded into, or upon a previously prepared end of the screw-threaded nut or plug $b$ and engages therewith, while its head, if a screw, or one face thereof, if a nut, engages with the smaller end face of the coned part $h'$ of the tubular cover-piece, for the especial purpose of forcing the coned part $h'$ of the cover-piece $h$ home upon the coned part $b^3$ of the screw-threaded nut or plug $b$ and said screw $i$ or the like further prevents the hand-gripping cover-piece $h$ being withdrawn therefrom. The cover-piece $h$ is thus made for all practical purposes an integral part of the screw-threaded nut or plug $b$ which primarily controls the opening and closing of the device. The mechanism or the moving parts for controlling the slidable jaw $a$ and its slide $a^6$ are contained in and upon a body, but what may be described more correctly as two half-body-pieces $g$, which are of peculiar shape, varying in each when taken sectionally from a semi-circular form $g'$ at the handle end $c$, to a wide single-hooked channel-form at the other end, see Fig. 5, $g$ and $g^3$. These half-body-pieces $g$ when placed together (to form a complete body) and then taken sectionally give as a result a round tubular form at the one end, and a flattened hollow form at the other, one side of which is open, while the other side (which joins the two parallel lines of the flattened hollow) is composed of two hooked parts $g^3$ approximately semi-circular in shape. About midway its section is approximately that of a hollow rectangle when the two parts are together, but when apart as shown in Fig. 5 they are of channel form $g^2$. In this hollow formed part, or between said body pieces $g$ the slidably mounted jaw-piece $a$, the fixed jaw-piece $f$ together with the slides on the jaw extension of the jaw $a$ and the slide faces which are provided one on one face of the fixed jaw-part $f$ and the others in the semi-circular formed parts $g^3$ of the body parts $a$ for the said purpose of accommodating the curved slides of the movable jaw $a^6$, all repose and snugly fit. This slidably mounted jaw-piece $a$ is especially formed with the extension $a^6$ which will correctly engage with and slide in each of the hooked sides $g^3$ of the half-body pieces $g$ and when it is so engaged as the result of its configuration, see section $a^6$ Fig. 5, it thereby holds at that part the two half-body pieces together and by so doing takes the strains imposed upon that part of the tool during the use thereof. The rivets, welding, or other means employed for securing the fixed jaw-piece $f$ in the half-body-pieces $g$ accept the strains imposed on the front or that other edge of the tool remote from the hooked formed parts $g^3$ during the use thereof.

The configuration or sectional shape of the half-body-pieces $g$ especially the flat hollow part of the tool $g^2$, together with its semi-circularly formed hooked ends $g^3$, decides to a great extent, irrespective of the gage of material from which they are made, the strength of the device.

The fixed jaw $f$ may be made integral with one of the half-body-pieces $g$, but for heavy service it is preferable that both the fixed jaw-piece $f$ and the movable jaw $a$ having slide faces prepared on its extension $a^6$ be made as separate units and secured (in the case of the fixed jaw $f$) in the two half-body pieces $g$ by rivets, screws, or the like, or where practical by the spot or other welding processes. The slides or slide faces upon which the extension $a^6$ of the movable jaw $a$ engages, are formed one upon the fixed jaw-piece $f$ and the others in the hooked parts $g^3$ of the body $g$ and the said jaw $a$ extension part $a^6$ is slidably mounted therein.

To suit the varying kinds of work the tool herein described may be called upon to perform, makes it imperative to vary the forms given to the gripping, cutting or engaging faces provided on the head of the tool. The following examples will make the beforementioned statement clear.

When the invention described herein is made up as an adjustable spanner, see Figs. 1, 2, 3 and 5, for holding nuts, bolts, and the like, parallel engaging faces $a^5$ and $g^5$ are provided on both the fixed and movable jaws $f$ and $a$, they are set at right angles to the movable jaw slides or sliding extension part $a^6$ thereof.

There are, however, two further engaging faces provided, see Figs. 1, 2, 3 and 5, one as a web $a'$ on the movable jaw $a$ and the other or others $g^4$ as a part on each of the half-body-pieces $g$; said faces $a'$ and $g^4$ are purposely set at an angle of 30 degrees to each parallel gripping face $a^5$ and $g^5$ of the jaws $a$ and $f$ and these 30 degree angle faces in addition to the parallel faces $a^5$ and $g^5$ enable the tool or more correctly the engaging faces thereof to become secured upon four sides of any hexagonal nut the device may be holding. The web $a'$ provided on the movable jaw $a$ also further serves to strengthen that unit at its weakest part.

When this invention is made up or its head is formed to act as a pipe-wrench, see Fig. 4, the jaws $a$ and $f$ are so formed that they have curves $a^4$ sympathetically formed for engaging with any diameter of pipe, tube, or cylinder that comes within the range or capacity of the tool. One of the jaws, however, has teeth or serrations provided thereon and it is preferably upon the inner face of the movable jaw $a$ that such serrations or saw-shaped teeth $a^2$ are formed for the purpose of engaging tubes, or the like, whereas the fixed jaw $f$ is preferably made or provided with a curved plain contact-face $a^4$ when used for pipe or similar work.

One of the objects of forming the jaws $a$ and $f$ with curved faces $a^4$ which are sympathetic to the article they are intended to hold, is that when one of the said curved faces $a^4$ is provided with teeth $a^2$ such curvature actually insures more teeth engaging with the tube, or whatever the tool may be holding, than would be the case when flat tooth surfaces or opposing toothed curves are employed.

A further object is, that it allows the curves $a^4$ to be so arranged or positioned that when pressed in one direction automatic wedging or locking of the jaws $a$ and $f$ of the tube, pipe, or the like, occurs but when the jaws $a$ and $f$ are caused to move in the opposite direction to the inclination of the teeth $a^2$ provided thereon said jaws automatically free themselves from whatever they may be placed upon and holding and no grippping takes place. The before-mentioned curvature given to the jaw engaging faces insures for both the plain and toothed members thereof an enormous increase in the area of contact at that part where they engage any rounded form, thereby mitigating the tendency to crush in the walls of this tubing such as is usual with the flat or oppositely curved tooth faces, or plane or oppositely curved smooth faces of adjustable pipe-grips.

This construction enables the tool when made up as an adjustable pipe-wrench to be used ratchet-wise, although no ratchets, pawls, or the like, are included in its construction.

The curves of the jaws $a^4$ are so arranged that when taken from the extremities of the jaws they constantly approach each other and thus establish an automatic wedge, which as before stated, and mainly due to the sympathetic curvature given to the jaws does not injure (to any appreciable extent) the cylindrically formed objects the tool is devised to hold in the manner that opposing curved or flat engaging faces do.

In many cases where a nut or plug is sunk or housed in a small recess, the ordinary wrench jaws will not enter and cannot therefore be employed for tightening or loosening said nut, but with the device shown in Figs. 2 and 3 this invention is provided with means that enables such an operation to be performed. Referring to the drawings Figs. 2 and 3 it will be seen that projections $a^3$ are, or may be formed, one on each jaw $a$ and $f$ and they may be on one or both sides of the tool. The said projections $a^3$ are specially provided for enabling the tool to grip anything in a recess and are therefore formed with internal gripping faces having either flats to suit nut angles, or alternatively with serrations or teeth for gripping rounded plugs or the like.

The tool as shown in Fig. 1 provided with the slight modification or the addition of projections $a^3$ on each jaw thereof as referred to in the previous paragraph, thus becomes an adjustable box-spanner, whose bosses or projections $a^3$ will turn in the same sized recess as the ordinary box-spanner. The said adjustable tool has, however, the further advantages of being adjustable and of being tightly clamped upon whatever object it is holding, and it substitutes or takes the place of a big range of fixed box-spanners.

When this invention is made up as a pipe-cutter, see Figs. 6 and 7, the jaws are formed to accommodate four knife-edge wheels $j$ which are provided and pivotally mounted, as at $j'$, in suitably prepared recesses $j^2$ in each jaw, two knife-edge wheels $j$ being located in the fixed jaw $f$ and two in the movable jaw $a$ of the device, or as a modification they may be mounted in a like position of placement on one side of each of the jaws *a* and *f* by means of headed screws or the like. As the direct result of the jaw *a* opening at an inclination to the axis of the handle or stem *c* of the body *g* of the tool, four wheels automatically come into engagement for the act of cutting the larger diameters of pipe or tube, whereas three wheels only come into engagement for the act of cutting the smaller diameters, and it is as before stated due to the inclined opening of the jaw *a* only and not to the placement of the wheels in either the jaw *a* or *f* that permits the construction of a tool where three wheel cutters in duplicate are available for small diameter cutting as shown in Fig. 6, and on the same tool without alteration excepting the opening of the jaws, the four wheels cutting automatically takes place for the larger diameter of pipe or tube that the device is designed to accommodate.

Protection is given against the inclusion of dirt or foreign matter and for reinforcement to important parts by the cover-tube *h* encircling the handle part *c* of the tube, said protection and reinforcement are particularly given to the screw-threaded controlling plug *b*, its threads and the threads turning therein, which latter are thereby relieved from all side strains (imposed on that part when operating the tool) by the said cover tube *h*, otherwise, bending and wedging of the threads would result in use.

When the oxy-acetylene or other welding process is employed for joining the two half-body-pieces *g* together, it is found sufficient to employ, both on the back of the movable jaw slide $a^6$ and in the half-body-pieces *g* (when taken sectionally) where these parts engage with one another, a single semi-circular curve, but other modifications in the construction may be employed for obtaining a true parallel opening of the jaws *a* and *f* both as regards their engaging faces $a^5$ and $g^5$ as well as their ends, provided this is accomplished at an angle or inclination to the axis of the handle *c* of the tool, without departing from the spirit of the invention.

The adjustable spanner, pipe-wrench, or pipe-cutter referred to in the foregoing description contains all the essential features of this invention, and in use, as a result of their jaws being designed and constructed to open and close at an angle or inclination to the axis of the handle or stem of the tool, makes it possible with these adjustable devices to work or operate with them in such limited space as to place them in a class not comparable with other known devices for similar purposes.

The method of construction of the devices herein described and illustrated, when employed, insures the most perfect mechanical effects, and precludes the possibility of slackness or looseness of the jaws developing. It allows however a definite width of opening of the jaws to be made, which can be depended upon to remain as set, even under the severest loads or strains. The jaw-extension-piece being a good sliding fit, in, or on, the parts it slides upon, thus prevents the ingress of dirt or foreign matter into the interior of the tool at that end thereof.

What I claim is:—

1. A device of the class specified, comprising a tubular body with a laterally widened extremity having an inclined side and passage therethrough and embodying a fixed engaging jaw and handle, a slidable jaw having a shank movable in the body and an outer angular gripping extremity to project over the said engaging jaw of the body, and a controlling sleeve and rod for said slidable jaw shank, the shank being movably connected to the rod and shiftable into and outwardly from the said inclined passage of the body at an angle of inclination to the axis of the body and handle and sleeve and rod.

2. A device of the class specified comprising a tubular body with a laterally widened extremity with an inclined side and passage therethrough and embodying a fixed engaging jaw and a handle, a slidable jaw having a shank movable in the body and an outer angular gripping extremity to project over the said engaging jaw of the body, a screw rod and sleeve nut inclosed in the handle for controlling the movement of said slidable jaw, and link means movably connected to the screw rod and the shank of the slidable jaw, the said shank being movable into and out of the said inclined passage of the body at an angle of inclination to the axis of the body and handle and controlling rod, nut and sleeve.

3. A device of the class specified comprising a tubular body with a laterally widened extremity with an inclined side and passage therethrough and embodying a fixed engaging jaw and a handle, a slidable jaw having a shank movable in the body and an outer angular gripping extremity to project over the said engaging jaw of the body, a screw rod and sleeve nut inclosed in the handle for controlling the movement of said slidable jaw, the sleeve nut and interior wall of the handle being provided with engaging ridges and grooves to prevent longitudinal movement of the sleeve nut, and movable means connecting the screw rod and the shank of the slidable jaw, the said shank being movable into and outwardly from said inclined passage of the body at an angle of inclination to the body and its handle and the said nut and rod.

4. A device of the class specified comprising a tubular body with a laterally widened extremity embodying a fixed engaging jaw and a handle, a slidable jaw having a shank movable in the body and an outer angular gripping extremity to project over the said engaging jaw of the body, a screw rod and sleeve nut inclosed in the handle for controlling the movement of said slidable jaw, the handle having an elongated operating cover grip and the sleeve nut having a conical terminal with an outer roughened surface and the interior of the cover grip provided with an interiorly roughened conical extremity to receive and engage the conical extremity of the sleeve nut, and movable means connecting the screw rod and shank of the slidable jaw for the purposes specified.

5. A device of the class specified comprising a tubular body with a laterally widened extremity with an inclined side and passage therethrough and embodying a fixed engaging jaw and a tubular handle having an operating cover grip movable thereon, a slidable jaw having a shank movable in the body and an outer angular gripping extremity to project over the said fixed engaging jaw of the body, the latter jaw and the said angular gripping extremity having interacting cutting devices movably carried thereby, actuating means in the handle and cover grip for the slidable jaw, and means movably connecting a part of said actuating means and the shank of the slidable jaw, the slidable jaw shank being movable into and outwardly from said inclined passage of the body at an angle of inclination to the body and its handle and the actuating means.

FRANK HUMPHRIS.

Witnesses:
ERNEST ZAPPERT,
GEORGE HARRISON.